United States Patent
Juneja

(10) Patent No.: US 11,012,931 B2
(45) Date of Patent: May 18, 2021

(54) METHODS, SYSTEMS, AND COMPUTER READABLE MEDIA FOR ENHANCED SIGNALING GATEWAY (SGW) STATUS DETECTION AND SELECTION FOR EMERGENCY CALLS

(71) Applicant: Oracle International Corporation, Redwood Shores, CA (US)

(72) Inventor: Rohit Juneja, Nepean (CA)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/422,908

(22) Filed: May 24, 2019

(65) Prior Publication Data

US 2020/0374794 A1    Nov. 26, 2020

(51) Int. Cl.
*H04W 48/20*    (2009.01)
*H04W 4/90*    (2018.01)
(Continued)

(52) U.S. Cl.
CPC .............. *H04W 48/20* (2013.01); *H04W 4/90* (2018.02); *H04W 8/08* (2013.01); *H04W 76/50* (2018.02); *H04W 80/10* (2013.01)

(58) Field of Classification Search
CPC ....... H04W 48/20; H04W 4/90; H04W 76/50; H04W 8/08; H04W 80/10
See application file for complete search history.

(56) References Cited

U.S. PATENT DOCUMENTS 5,371,852 A    12/1994    Attanasio et al.
5,710,885 A    1/1998    Bondi
(Continued)

FOREIGN PATENT DOCUMENTS

EP    3 018 941 A1    5/2016
IN    333811    3/2020
(Continued)

OTHER PUBLICATIONS

"Universal Mobile Telecommunications (UMTS)," 3rd Generation Partnership Project, 3GPP TS 29.212, V13.5.0, Release 13, pp. 1-258 (Apr. 2016).
(Continued)

*Primary Examiner* — Ronald B Abelson
(74) *Attorney, Agent, or Firm* — Jenkins, Wilson, Taylor & Hunt, P.A.

(57) ABSTRACT

The subject matter described herein includes a method for enhanced signaling gateway status detection and selection for emergency calls. The method includes, in a mobility management entity (MME) including at least one processor, detecting that a signaling gateway is in a risky state using a combination of echo request and call setup signaling timeouts. The method further includes marking the signaling gateway as risky in a signaling gateway status database maintained by the MME. The method further includes performing signaling gateway selection for an emergency call in a manner that excludes signaling gateways marked as risky. The method further includes routing the emergency call to a signaling gateway selected by the signaling gateway selection.

16 Claims, 8 Drawing Sheets

(51) Int. Cl.
    *H04W 76/50*    (2018.01)
    *H04W 8/08*     (2009.01)
    *H04W 80/10*    (2009.01)

(56) References Cited

U.S. PATENT DOCUMENTS

| | | |
|---|---|---|
| 5,719,861 A | 2/1998 | Okanoue |
| 5,870,455 A | 2/1999 | Campbell et al. |
| 5,937,343 A | 8/1999 | Leung |
| 6,058,116 A | 5/2000 | Hiscock et al. |
| 6,088,721 A | 7/2000 | Lin et al. |
| 6,105,034 A | 8/2000 | Buckler |
| 6,263,361 B1 | 7/2001 | Hoyer et al. |
| 6,331,983 B1 | 12/2001 | Haggerty et al. |
| 6,366,577 B1 | 4/2002 | Donovan |
| 6,385,198 B1 | 5/2002 | Ofek et al. |
| 6,404,746 B1 | 6/2002 | Cave et al. |
| 6,421,674 B1 | 7/2002 | Yoakum et al. |
| 6,434,143 B1 | 8/2002 | Donovan |
| 6,446,127 B1 | 9/2002 | Schuster et al. |
| 6,564,261 B1 | 5/2003 | Gudjonsson et al. |
| 6,601,099 B1 | 7/2003 | Corneliussen |
| 6,615,236 B2 | 9/2003 | Donovan et al. |
| 6,625,141 B1 | 9/2003 | Glitho et al. |
| 6,636,596 B1 | 10/2003 | Gallant et al. |
| 6,650,901 B1 | 11/2003 | Schuster et al. |
| 6,665,702 B1 | 12/2003 | Zisapel et al. |
| 6,728,748 B1 | 4/2004 | Mangipudi et al. |
| 6,735,291 B1 | 5/2004 | Schmid et al. |
| 6,738,390 B1 | 5/2004 | Xu et al. |
| 6,757,732 B1 | 6/2004 | Sollee et al. |
| 6,779,039 B1 | 8/2004 | Bommareddy et al. |
| 6,839,752 B1 | 1/2005 | Miller et al. |
| 6,856,591 B1 | 2/2005 | Ma et al. |
| 6,857,021 B1 | 2/2005 | Sidhu et al. |
| 6,914,900 B1 | 7/2005 | Komatsu et al. |
| 6,937,563 B2 | 8/2005 | Preston et al. |
| 6,992,994 B2 | 1/2006 | Das et al. |
| 7,020,707 B2 | 3/2006 | Sternagle |
| 7,028,092 B2 | 4/2006 | MeLampy et al. |
| 7,054,272 B1 | 5/2006 | Noel et al. |
| 7,134,011 B2 | 11/2006 | Fung |
| 7,286,521 B1 | 10/2007 | Jackson et al. |
| 7,308,499 B2 | 12/2007 | Chavez |
| 7,631,093 B2 | 12/2009 | Sternagle |
| 7,742,421 B2 | 6/2010 | Bantukul et al. |
| 7,929,419 B2 | 4/2011 | Sprague |
| 2001/0021173 A1 | 9/2001 | Oohashi et al. |
| 2001/0039585 A1 | 11/2001 | Primak et al. |
| 2002/0075844 A1 | 6/2002 | Hagen |
| 2002/0075880 A1 | 6/2002 | Dolinar et al. |
| 2002/0080807 A1 | 6/2002 | Lind |
| 2002/0110113 A1 | 8/2002 | Wengrovitz |
| 2002/0145975 A1 | 10/2002 | MeLampy et al. |
| 2002/0176404 A1 | 11/2002 | Girard |
| 2003/0086410 A1 | 5/2003 | Eikkula |
| 2004/0088424 A1 | 5/2004 | Park et al. |
| 2004/0114744 A1 | 6/2004 | Trossen |
| 2004/0158606 A1 | 8/2004 | Tsai |
| 2004/0205190 A1 | 10/2004 | Chong et al. |
| 2004/0221061 A1 | 11/2004 | Chavez |
| 2005/0147087 A1 | 7/2005 | Sternagle |
| 2005/0157707 A1 | 7/2005 | Sternagle |
| 2005/0180396 A1* | 8/2005 | Lim ................. H04L 12/66 |
| 2005/0207402 A1 | 9/2005 | Kobayashi et al. |
| 2005/0227685 A1 | 10/2005 | Costa Requena et al. |
| 2005/0232407 A1 | 10/2005 | Craig et al. |
| 2006/0010321 A1 | 1/2006 | Nakamura et al. |
| 2006/0069776 A1 | 3/2006 | Shim et al. |
| 2006/0101143 A1 | 5/2006 | Garcia et al. |
| 2007/0156909 A1 | 7/2007 | Osborn et al. |
| 2007/0191004 A1 | 8/2007 | Yamakawa et al. |
| 2008/0056234 A1 | 3/2008 | Sprague |
| 2008/0280623 A1 | 11/2008 | Danne et al. |
| 2009/0040923 A1 | 2/2009 | Bantukul et al. |
| 2009/0268723 A1 | 10/2009 | Przybysz |
| 2011/0141884 A1* | 6/2011 | Olsson ................. G06F 11/07 |
| 2014/0050199 A1* | 2/2014 | Chen ................. H04W 36/0022 |
| 2015/0029999 A1* | 1/2015 | Horn ................. H04W 36/22 |
| 2016/0135238 A1 | 5/2016 | Lu et al. |

FOREIGN PATENT DOCUMENTS

| | | |
|---|---|---|
| JP | 2006-279805 A | 10/2006 |
| KR | 10-2004-0057858 A | 7/2004 |
| KR | 10-2005-0002335 A | 1/2005 |
| KR | 10-2006-0025869 A | 3/2006 |
| WO | WO 00/69140 | 11/2000 |
| WO | WO 01/13228 A2 | 2/2001 |
| WO | WO 02/097653 A1 | 2/2002 |
| WO | WO 2008/019056 A2 | 2/2008 |
| WO | WO 2009/018418 A2 | 2/2009 |

OTHER PUBLICATIONS

Notification of Reexamination for Chinese Patent Application No. 200880109633.9 (dated Jul. 28, 2014).
Communication under Rule 71(3) EPC for European Application No. 02 734 585.9 (dated Jan. 10, 2012).
Notice of Granting Patent Right for Invention for Chinese Patent Application No. 200780036907.1 (dated Sep. 22, 2011).
European Search Report for European Patent Application No. 08796925.9 (dated Nov. 21, 2014).
Final Office Action for U.S. Appl. No. 11/065,900 (dated Aug. 4, 2011).
Official Action for U.S. Appl. No. 11/065,900 (dated Mar. 7, 2011).
Notice of Allowance for U.S. Appl. No. 11/510,284 (dated Dec. 9, 2010).
Chinese Office Action for Chinese Patent Application No. 200780036907.1 (dated Oct. 11, 2010).
Final Official Action for U.S. Appl. No. 11/510,284 (dated Jun. 22, 2010).
Final Official Action for U.S. Appl. No. 11/065,900 (dated Jun. 3, 2010).
Official Action for U.S. Appl. No. 11/510,284 (dated Feb. 23, 2010).
Notice of Allowance and Fee(s) Due for U.S. Appl. No. 12/183,406 (dated Feb. 12, 2010).
Official Action for U.S. Appl. No. 11/065,900 (dated Oct. 14, 2009).
Notice of Allowance for U.S. Appl. No. 11/065,876 (dated Sep. 9, 2009).
Interview Summary for U.S. Appl. No. 11/065,900 (dated Sep. 4, 2009).
Final Official Action for U.S. Appl. No. 11/510,284 (dated Jul. 9, 2009).
Final Official Action for U.S. Appl. No. 11/065,900 (dated Apr. 20, 2009).
Final Official Action for U.S. Appl. No. 11/065,876 (dated Mar. 2, 2009).
Notification of Transmittal of the International Search Report and the Written Opinion of the International Searching Authority, or the Declaration for the International Application No. PCT/US2008.071718 (dated Jan. 28, 2009).
Official Action for U.S. Appl. No. 11/510,284 (dated Dec. 24, 2008).
"Link Aggregation," IEEE Standard for Local and Metropolitan Area Networks, IEEE Std. 802.1AX, pp. 1-163 (Nov. 3, 2008).
Office Action for U.S. Appl. No. 11/065,900 (dated Aug. 5, 2008).
Commonly-assigned, co-pending U.S. Appl. No. 12/183,406 for "Systems, Methods, and Computer Program Products for Distributing Application or Higher Layer Communications Network Signaling Entity Operational Status Information Among Session Initiation Protocol (SIP) Entities," (Unpublished, filed Jul. 31, 2008).
Official Action for U.S. Appl. No. 11/065,876 (dated May 30, 2008).
Interview Summary for U.S. Appl. No. 11/065,876 (dated Apr. 11, 2008).
Interview Summary for U.S. Appl. No. 11/065,900 (dated Apr. 1, 2008).

(56) References Cited

OTHER PUBLICATIONS

Notification of Transmittal of the International Search Report and the Written Opinion of the International Searching Authority, or the Declaration for International Application No. PCT/US07/17329 (dated Feb. 15, 2008).
Official Action for U.S. Appl. No. 11/065,876 (dated Nov. 16, 2007).
Official Action for U.S. Appl. No. 11/065,900 (dated Oct. 31, 2007).
Office Action for European Application No. 02 734 585.9-2413 (dated Aug. 29, 2007).
Supplementary European Search Report for European Application No. 02734585.9-2413 (dated Jun. 11, 2007).
European Search Report for European application No. 02734585.9 (dated May 23, 2007).
Office Action for U.S. Appl. No. 11/065,876 (dated Feb. 8, 2007).
Notice of Allowance and Fee(s) Due for U.S. Appl. No. 09/867,879 (dated Jan. 3, 2006).
Official Action for U.S. Appl. No. 09/867,879 (dated Jun. 17, 2005).
Restriction and/or Election Requirement for U.S. Appl. No. 09/867,879 (dated Dec. 15, 2004).
Notification of Transmittal of The International Search Report or the Declaration for International Application No. PCT/US02/16915 (dated Sep. 5, 2002).
A. B. Roach, "Session Initiation Protocol (SIP)-Specific Event Notification," dynamicsoft, Network Working Group, pp. 1-38 (Jun. 2002).
Rosenberg, "SIP Proxies," www.dynamicsoft.com, pp. 1-30 (Jul. 2000).
Wiesmann et al., "Understanding Replication in Databases and Distributed Systems," IEEE, pp. 464-474 (Apr. 10, 2000).
Wang et al., "A Signaling System Using Lightweight Call Sessions," IEEE, pp. 697-706 (Mar. 26, 2000).
Gribble et al., "The MultiSpace: an Evolutionary Platform for Infrastructural Services," The University of California at Berkeley, pp. 157-170 (Jun. 6, 1999).
Handley et al., "SIP: Session Initiation Protocol," IETF RFC 2543, pp. 1-153 (Mar. 1999).
Handley et al., "SDP: Session Description Protocol," IETF RFC 2327, pp. 1-42 (Apr. 1998).
S. Paul et al., "Reliable Multicast Transport Protocol (RMTP)," IEEE Journal on Selected Areas in Communications, vol. 15, No. 3, pp. 407-421 (Apr. 1997).
Lin et al., "A Reliable Multicast Transport Protocol," IEEE INFOCOM, pp. 1414-1424 (1996).
"Evolved General Packet Radio Service (GPRS) Tunnelling Protocol for Control plane (GTPv2-C)," 3rd Generation Partnership Project, 3GPP TS 29.274, V15.7.1, Release 15, pp. 1-395 (Mar. 2019).
"General Packet Radio Service (GPRS) enhancements for Evolved Universal Terrestrial Radio Access Network (E-UTRAN) access," 3rd Generation Partnership Project, 3GPP TS 23.401, V16.2.0, Release 16, pp. 1-418 (Mar. 2019).
"GPRS Tunnelling Protocol (GTP) across the Gn and Gp interface," 3rd Generation Partnership Project, Technical Specification Group Core Network and Terminals, 3GPP TS 29.060, V15.4.0, Release 15, pp. 1-194 (Mar. 2019).
"GPRS Tunnelling Protocol (GTP) across the Gn and Gp interface," Digital cellular telecommunications system (Phase 2+) (GSM), Universal Mobile Telecommunications System (UMTS), ETSI TS 129 060, V15.2.0, Release 15, pp. 1-191 (Jul. 2018).
Notification of Transmittal of the International Search Report and the Written Opinion of the International Searching Authority, or the Declaration for International Application No. PCT/US2020/024519 (dated Sep. 11, 2020).
"3rd Generation Partnership Project; Technical Specification Group Core Network and Terminals; General Packet Radio Service (GPRS); GPRS Tunnelling Protocol (GTP) across the Gn and Gp interface (Release 15)," 3GPP TS 29.060, V15.2.0, pp. 1-193 (Mar. 2018).

\* cited by examiner

METHODS, SYSTEMS, AND COMPUTER READABLE MEDIA FOR ENHANCED SIGNALING GATEWAY (SGW) STATUS DETECTION AND SELECTION FOR EMERGENCY CALLS

TECHNICAL FIELD

The subject matter described herein relates to selecting or reselecting signaling gateways to handle emergency calls. More particularly, the subject matter described herein relates to methods, systems, and computer readable media for enhanced signaling gateway status detection and selection for emergency calls.

BACKGROUND

The signaling gateway is the node in the telecommunications network that communicates call setup signaling messages to a remote signaling gateway to set up voice calls between users. In some instances, the signaling gateway may go out of service, because of a hardware or software failure. In other instances, call setup may be delayed because there are multiple legs of the call between the end users. It may be desirable to avoid a failed or failing SGW for call setup procedures. In the event of multi-leg call setup traversal, it is desirable to wait for the SGW to respond to a call setup request. It may be difficult to distinguish between SGW failure and multi-leg traversal.

The mobility management entity (MME) is the node in the 3GPP mobile communications network that communicates with a signaling gateway to setup a call. While there are existing mechanisms for the MME to detect failure of a signaling gateway, the mechanisms can result in unacceptable delays in detecting the failure. In addition, as stated above, it is difficult to determine whether the signaling gateway has failed or whether the delay in establishing the call is due to communications between multiple legs of the call.

For some types of calls, such as regular priority calls, the existing signaling gateway failure detection mechanisms are sufficient, as a delay in call setup is not critical for normal priority calls. However, for emergency calls, such as E911 calls, delayed call setup is unacceptable.

Accordingly, there exists a need for improved methods, systems, and computer readable media for signaling gateway status detection and selection for emergency calls.

SUMMARY

The subject matter described herein includes a method for enhanced signaling gateway status detection and selection for emergency calls. The method includes, in a mobility management entity (MME) including at least one processor, detecting that a signaling gateway is in a risky state using a combination of echo request and call setup signaling timeouts. The method further includes marking the signaling gateway as risky in a signaling gateway status database maintained by the MME. The method further includes performing signaling gateway selection for an emergency call in a manner that excludes signaling gateways marked as risky. The method further includes routing the emergency call to a signaling gateway selected by the signaling gateway selection.

According to one aspect of the subject matter described herein, detecting that the signaling gateway is in a risky state includes detecting that the signaling gateway is in a risky state in response to an echo request timeout from the MME to the signaling gateway and two create session request timeouts from the MME to the signaling gateway.

According to another aspect of the subject matter described herein, the echo request timeout occurs prior to the create session request timeouts.

According to yet another aspect of the subject matter described herein, the echo request timeout occurs after one of the create session request timeouts.

According to yet another aspect of the subject matter described herein, transmission of an echo request message for which the echo request timeout occurs is triggered by detection of a second of the two create session request timeouts.

According to yet another aspect of the subject matter described herein, the two create session request timeouts are for the same call.

According to yet another aspect of the subject matter described herein, the two create session request timeouts are for different calls.

According to yet another aspect of the subject matter described herein, performing the signaling gateway selection includes performing the signaling gateway selection in response to an initial attach message from an evolved Node B (eNode B).

According to yet another aspect of the subject matter described herein, performing the signaling gateway selection includes selecting a new signaling gateway for a call for which a signaling gateway assigned to the call is determined to be risky during setup of the call.

According to yet another aspect of the subject matter described herein, performing the signaling gateway selection includes selecting a new signaling gateway for a call for which a default bearer exists on an signaling gateway currently assigned to the call and that has been marked as risky.

According to yet another aspect of the subject matter described herein, a system for enhanced signaling gateway status detection and selection for emergency calls includes a mobility management entity (MME) including at least one processor. The system further includes a signaling gateway status database located in the MME and containing status information for signaling gateways accessible by the MME. The system further includes a signaling gateway status detector and emergency call router for detecting that a signaling gateway is in a risky state using a combination of echo request and call setup signaling timeouts, marking the signaling gateway as risky in a signaling gateway status database maintained by the MME, performing signaling gateway selection for an emergency call in a manner that excludes signaling gateways marked as risky, and routing the emergency call to a signaling gateway selected by the signaling gateway selection.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein includes methods, systems, and computer readable media for enhanced signaling gateway status detection and selection for emergency calls. As described above, it is desirable for emergency call establishment that a network node, such as an MME, be able to rapidly detect when a signaling gateway goes down and when reselection of a new signaling gateway is required. When a response from a signaling gateway is delayed for a call setup request, it is not possible for the MME to ascertain if the delay is caused by multi-leg traversal of the request or if the signaling gateway has failed or restarted. The subject matter described herein provides for rapid detection of signaling gateway status and reselection of a signaling gateway if it is determined that an existing signaling gateway has failed or is likely to be in a failure state.

Figure 1:
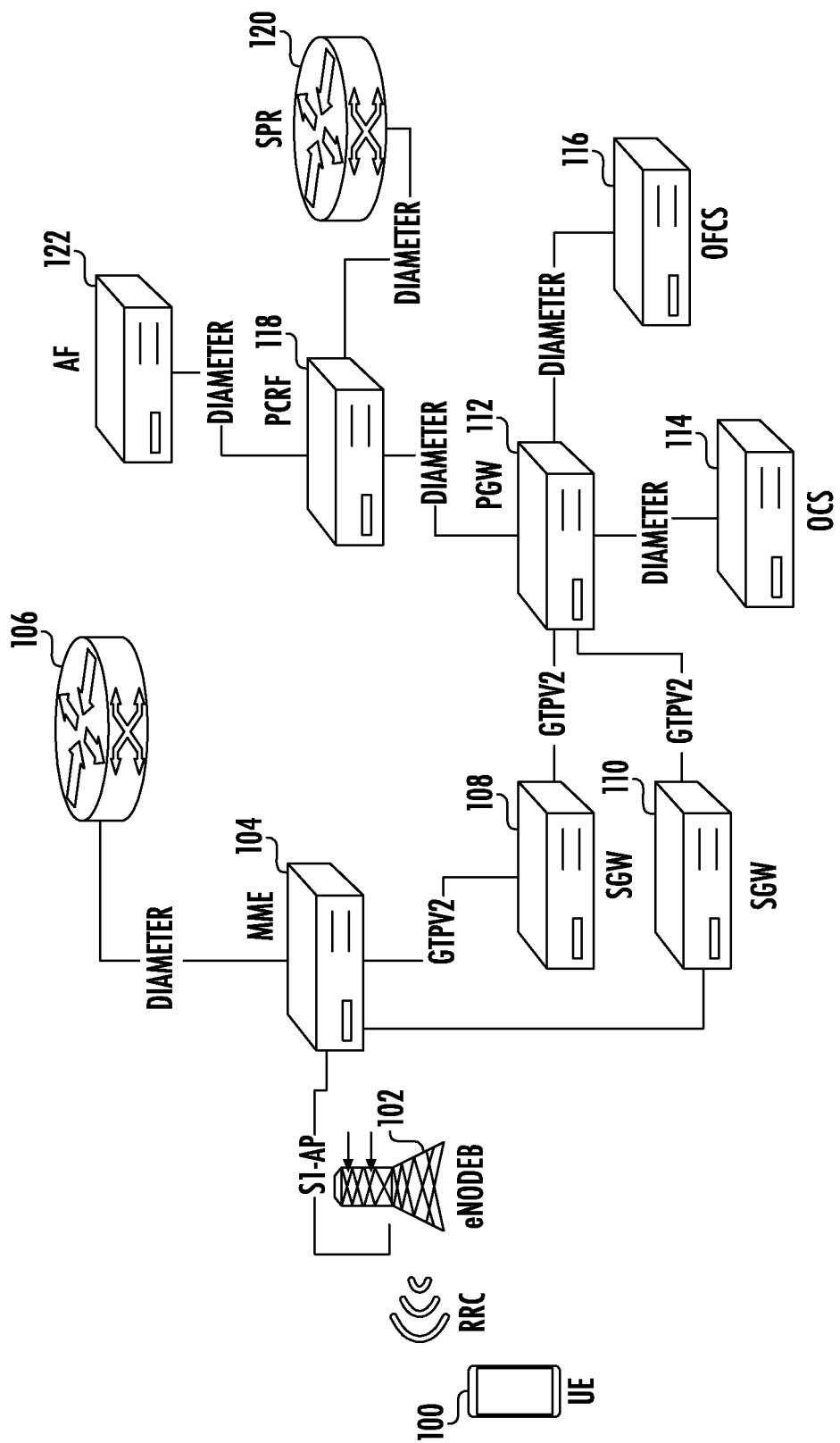
FIG. 1 is a network diagram illustrating an exemplary operating environment for enhanced signaling gateway failure detection and reselection for emergency calls.

FIG. 1 illustrates an exemplary operating environment for the subject matter described herein. Referring to FIG. 1, user equipment (UE) 100 may be a mobile device that attaches to an evolved node B (eNode B) 102 to communicate with the network. The eNode B 102 connects to an MME 104, which performs mobility management functions and call setup functions. A home subscriber server (HSS) 106 stores mobile subscription and location information.

Signaling gateways 108 and 110 perform call setup operations to establish calls between users, such as UE 100 and a remote user. As such, each signaling gateway 108 and 110 may implement session initiation protocol (SIP) or other call setup protocol to establish calls between end users. In the illustrated example, there are two signaling gateways 108 and 110. MME 104 may select one of the two signaling gateways to establish a given call. Once a signaling gateway is selected for the call, provided that no failure occurs, the signaling gateway will remain in the call setup signaling path and maintain state information for the call. However, when one of signaling gateways 108 or 110 fails, MME 104 may detect the failure and attempt to reestablish the call with an alternate available signaling gateway. The subject matter described herein includes methodology for rapid identification of failure of a signaling gateway and reselection of a new signaling gateway to establish a given call.

Also illustrated in FIG. 1 is a packet gateway (PGW) 112, which provides packet-based data communications, including call setup signaling communications between network elements. An online charging system (OCS) 114 and an offline charging system (OFCS) 116 respectively perform online and offline charging functions for communications between users. A policy and charging rules function (PCRF) 118 implements network policies for communications between users. A subscription profile repository (SPR) 120 stores subscriber profile information. An application function (AF) 122 provides application services for UE devices. In one example, the UE devices may be Internet of Things (IoT) devices, such as sensors, and AF 122 may be a server that obtains data from the IoT devices.

One mechanism that can be used by MMEs to detect failure of a signaling gateway is the path management procedure described in 3GPP TS 29.060, V 15.4.0 (2019-03). According to the path management procedure described in TS 29.060, a gateway support node (GSN) or radio network controller (RNC) may send an echo request on a path to another GSN or RNC to find out if the peer GSN or RNC is alive. Echo request messages may be sent for each path associated with at least one of the active packet data protocol (PDP) context, multimedia broadcast/multicast (MBMS) UE context, or bearer context. When and how the echo request message is sent is implementation specific, but 3GPP TS 29.060 indicates that the echo request should not be sent more often than every sixty seconds on each path (see section 7.2.1 of 3GPP TS 29.060).

When a sending node sends an echo request message on a path, the sending node starts a timer. If the timer times out before an echo response is received, a timeout occurs, and the path is considered to be down. Example values of the echo response timeout can be from five to fifteen seconds and may be more, depending on the network configuration. The SGW must be prepared to receive an echo request at any time and reply with an echo response.

If the MME detects that the SGW or an S11 path has failed, the MME maintains UE context data for all UEs associated with the SGW and starts a restoration timer. An S11 path is a path between the MME and the SGW. The interface between the MME and the SGW is referred to as the S11 interface. The UE contexts are maintained on the MME for the duration of the restoration timer. Each S11 path has its own timer. A session hold time out configures a session hold timer for SGW restoration. The session hold timer must be an integer from 1 to 3600 seconds.

Another type of procedure implemented by MMEs to account for failing SGWs is requesting retransmission of a signaling message. According to 3GPP TS 29.060, a T3 response timer is started with signaling request message for which a response has been defined as sent. A signaling message request or response has probably been lost if a response is not received before the T3 response timer expires. The request is then retransmitted if the total number of request attempts is less than a number N3-request times. The timer is implemented in the control plane application as well as the user plane application for echo requests and echo responses. The wait time for a response (the T3 response timer value) and the number of retries (N3-request) is configurable by the network operator on a per procedure basis. The MME may implement a default timer of approximately five seconds for retry of a connectivity request. The MME may also have a maximum retry configuration of five times.

Once the T3 response timer expires, the message corresponding to the T3 response timer is retransmitted if the number of retry attempts is less than N3-request times. The T3 response timer and N3-requests counter settings are implementation dependent. That is, the timers and counters are configurable per procedure. Multi-leg communications, such as create session requests and responses, require longer timer values and possibly a higher number of retransmission attempts as compared to a single leg communication. Thus, depending on the value of the counters and the number of retry attempts, call setup can be significantly delayed according to existing 3GPP echo request, response, and retransmission procedures.

Yet another document that further describes 3GPP functionality relating to SGW failure detection and recovery is 3GPP TS 29.274 V15.7.1 (2019-03). According to 3GPP 29.274, the echo request message contains a recovery information element. The recovery information element contains the value of the local restart counter. An optional private extension in the recovery information element can contain vendor or operator specific information. Yet another 3GPP document that describes 3GPP functionality relating to recovery from SGW failure is 3GPP TS 23.401 V16.2.0 (2019-03). For example, section 4.3.8.2 of 3GPP TS 23.401 defines the signaling gateway selection function. The signaling gateway selection function selects an available signaling gateway to serve a UE. The selection is based on network topology such that the signaling gateway serves the UE's location. Considerations related to selection of a signaling gateway include the probability of changing signaling gateways and load balancing considerations. Signaling gateway selection is performed by the MME.

TS 23.401 also defines procedures for emergency services, such as emergency calls. However, there is no mention of procedures for signaling gateway selection or reselection for emergency calls.

Yet another specification that governs recovery procedures when an SGW goes down is ETSI TS 29.160 V15.2.0 (2018-07). ETSI TS 29.160 is the same specification as 3GPP TS 29.060. According to ETSI TS 29.160, the GSN that receives an echo request from a peer GSN shall compare the restart counter value received with the previous restart counter value stored for that peer GSN. If no previous value is stored, the restart counter value received in the echo response is stored for the peer GSN. If the value of the restart counter previously stored for the peer is smaller than the restart counter value received in the echo response message, this indicates that the entity that sent the echo response has restarted. The received new restart counter value shall be stored by the receiving entity replacing the previously stored value for the peer.

Existing mechanisms for detecting SGW failure include the above-described echo request procedure and response timeouts. SGW failure with or without SGW restart consists of the MME maintaining UE context for a configurable period of time. When the MME detects path failure towards the SGW and the MME supports SGW restoration, then the MME relocates sessions from the failed SGW to another SGW. The MME sends an echo request message to an SGW and, if no response is received for three consecutive echo request messages, then the MME marks SGW as down and blacklisted.

Additionally, if three create session requests (CSReqs) for a call time out, then the SGW is marked as being down and is blacklisted. The general default value for each CSReq timeout is 60 seconds and can be more, depending on the network.

The SGW will be marked as down if it is not possible for MME to restore the context within a time period defined by a configurable restoration timer. The SGW restoration timer is configurable by operators with values ranging from 1 to 3600 seconds. If the same SGW has recovered, then context data is not maintained on the MME/PGW. Thus, using either the echo request or the retransmission timeout procedure for detecting SGW failure, the detection can take 180 seconds or longer.

One instance in which delayed detection of SGW failure is undesirable is for emergency calls. An emergency call is made with an emergency registration. In one example, the MME has not marked an SGW as down but no response obtained from the SGW due to partial failure/transition to failure condition. An emergency call starts with the emergency registration by the UE during the initial attach procedure. The attach type in the registration message indicates emergency attach. The MME selects the PGW based on the access point name (APN) provided in the initial attach message. The MME then selects the SGW based on the selected PGW and tracking area identifier (TAI) list. If the MME selects an SGW which is not marked as down/blacklisted but in partial failure condition, the MME would retry with three create session request and response timeouts, with each timeout at 60 seconds apart by default. Additionally, if three echo requests/responses fail, MME will mark the SGW as down. If there are pending call setup requests waiting for response, then those will be aborted as well. As indicated above, these existing mechanisms for handling SGW failure could lead to unacceptable delay in setting up emergency calls.

Another instance relating to emergency calls in which delayed detection of SGW failure causes further delay in emergency call establishment is when a default bearer is provided by a failed SGW. Like the previous examples, in this example, an emergency call is made with an emergency registration. The MME has not marked the SGW as down, but no response is obtained from the SGW due to partial failure/transition to failure condition. In this example, it is assumed that a default bearer already exists for the user with the failing SGW. The MME selects the same failing SGW while establishing the emergency call. If the MME selects a failing SGW, which is not marked as down/blacklisted but in partial failure condition, then the MME would retry with three create session request and response timeouts, with each timeout at 60 seconds apart by default. Additionally, if three echo request/response failures occur, the SGW is marked down, the transaction is aborted, and a new create session request is sent to an alternate SGW. Using this procedure, the delay in re-establishing the emergency call could be unacceptable.

Figure 2:
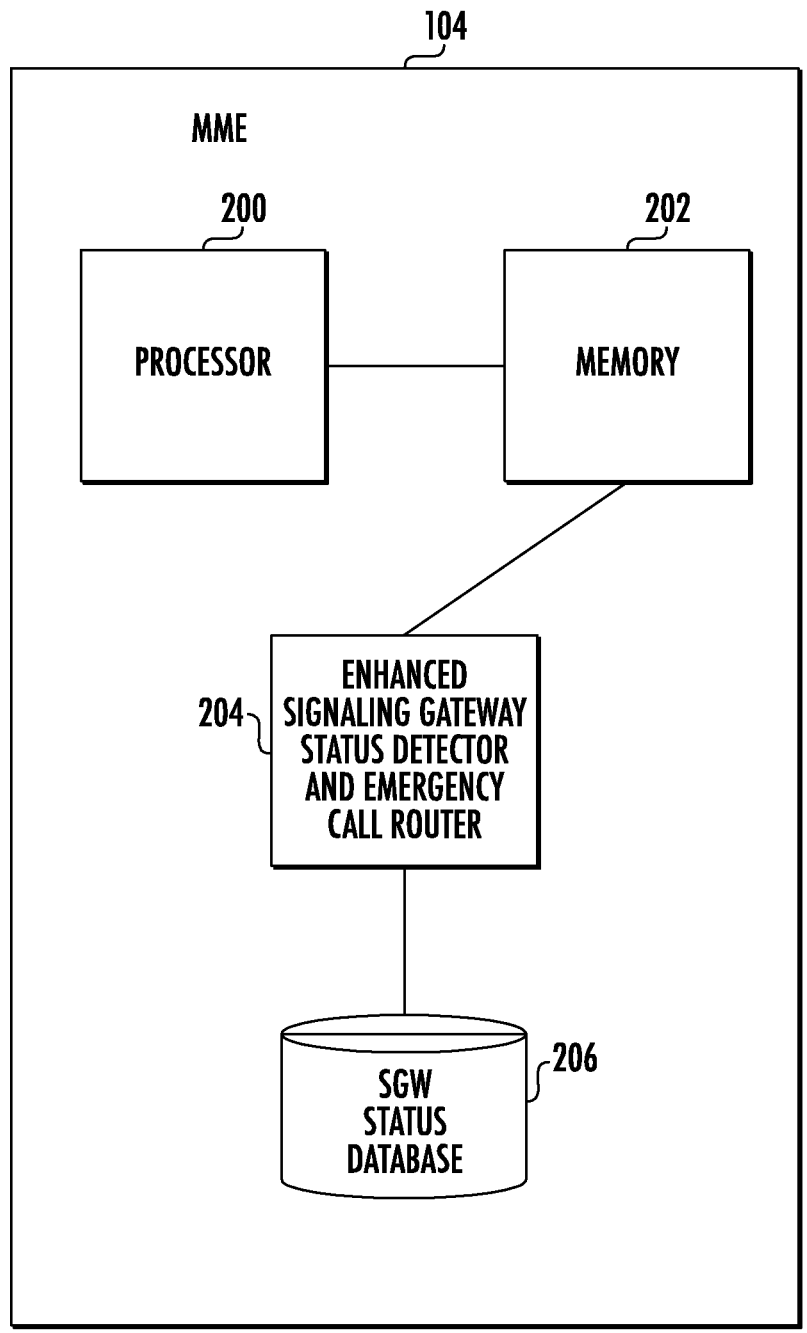
FIG. 2 is a block diagram of a mobility management entity for enhanced signaling gateway failure detection and reselection for emergency calls.

In order to avoid the unacceptable delays in detecting SGW failure in establishing emergency calls, the subject matter described herein includes a two-part solution in which SGWs are identified as risky or in a partially failed state. A list of risky, healthy, and blacklisted or down SGWs are maintained by the MME. The MME uses the list of SGWs and their corresponding state to determine whether or how to allow emergency calls. FIG. 2 is a block diagram illustrating an MME 104 with enhanced SGW failure detection and emergency call routing. Referring to FIG. 2, MME 104 includes at least one processor 200 and a memory 202.

MME 104 further includes an enhanced SGW status detector and emergency call router that rapidly detects SGW state, such as failed state, or partially failed state, stores SGW state in SGW status database 206 and uses the information in SGW status database 206 to establish and reestablish emergency calls. The operation of enhanced SGW status detector and emergency call router 204 will now be described in more detail.

In one example, enhanced SGW status detector and emergency call router 204 may utilize the following conditions to mark an SGW as risky in database 206. The following conditions may be used to mark an SGW as risky:

1. At least one echo request timeout from MME 104 to the SGW; and
2. Two create session request timeouts for any calls from MME 104 to the SGW in question. The create session request timeouts may be from the same call or from different calls. Whether to mark the SGW as risky based on consecutive create session request timeouts from the same call or different calls may be a configurable parameter.

If the above listed conditions are met, enhanced SGW status detector and emergency call router 204 may mark the SGW as risky in SGW status database 206. If two create session time outs occur between MME 104 and the SGW being tested and an echo request time out has not occurred, MME 104 may send an echo request message immediately, rather than waiting until the timeout period between echo requests expires. If the echo request times out, the SGW may be marked as risky. If the echo request does not time out, the SGW may be marked as up or available in the database 206.

If a response from an SGW marked as risky is received, then the status of the SGW may be marked as available or up. The response can be a response to a create session request or a response to an echo request.

The echo request timeout is generally five seconds, and the create session request timeout is sixty seconds. Either of these values can be increased depending on the network configuration. Thus, instead of waiting for three consecutive echo request timeouts, or three consecutive connection request timeouts, enhanced SGW status detector and emergency call router 204 marks an SGW as risky based on the above described combination of at least one echo request timeout and two create session request timeouts. Because echo request and create session request timeouts are used in combination to detect SGW status, the solution is more robust than methods that rely on these types of timeouts individually. In addition, because the number of timeouts required to mark an SGW are risky is reduced over the conventional case, SGW failure or riskiness can be detected more rapidly. Finally, because SGW status, including risky status, is stored in database 206 maintained by MME 104 and used by MME 104 in SGW selection, risky SGWs that would result in delayed emergency calls can be avoided.

In another example, risky SGW detection can be performed early if one echo request has already failed and two connection request timeouts occur across the MME to the SGW. In this case, the SGW is marked as risky and will be avoided for emergency calls.

Figure 3A:
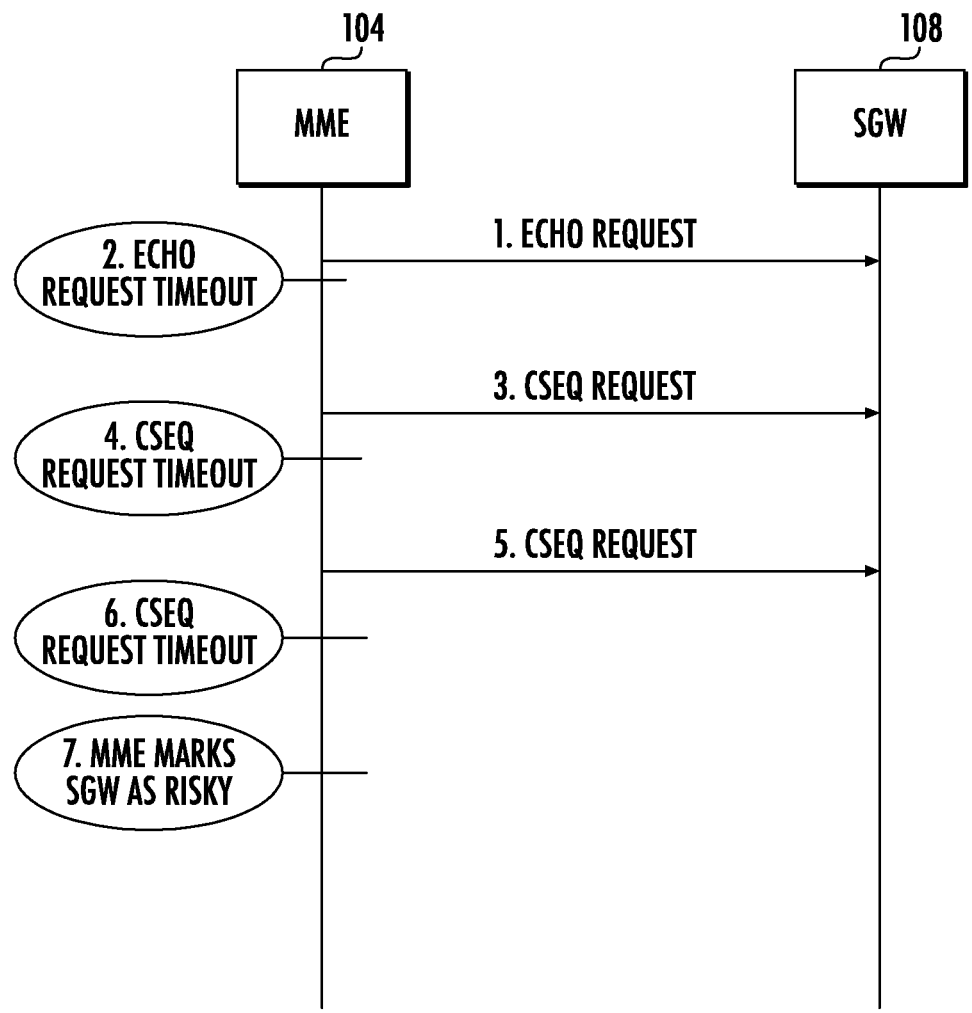
FIG. 3A is a call flow diagram illustrating one combination of messages and timings that will result in a signaling gateway being marked as risky.
Figure 3B:
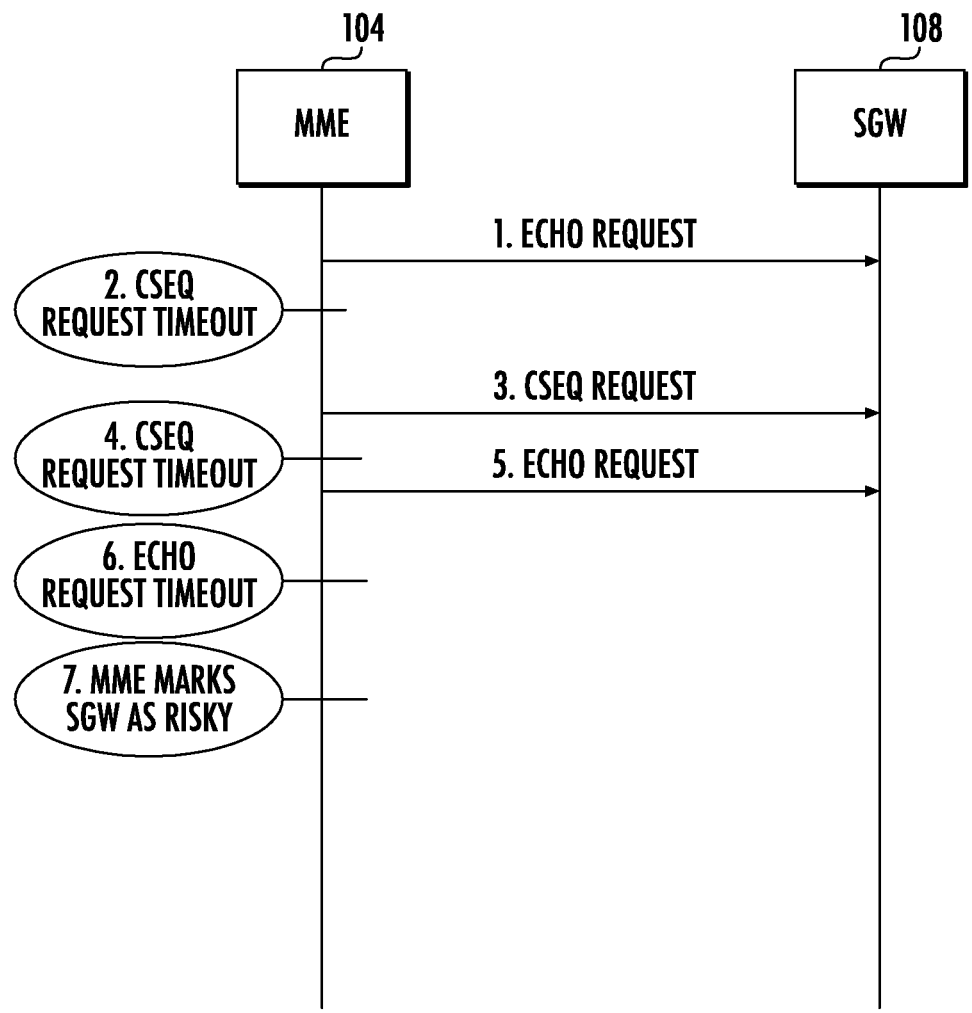
FIG. 3B is a call flow diagram illustrating another combination of messages and timings that will result in a signaling gateway being marked as risky.

FIGS. 3A and 3B are example call flows that illustrate two instances in which an SGW may be marked as risky. Referring to FIG. 3A, in line 1 of the call flow, MME 104 sends an echo request message to SGW 108. When MME 104 sends the echo request message, MME 104 starts an echo request timer, which may be set to a relatively short value, such as 5 seconds. If SGW 108 does not respond within the timeout period for the echo request, i.e., before the echo request timer expires, MME 104 may increment an echo request timeout counter, indicating that an echo request timeout has occurred. In line 2 of the call flow diagram, the echo request timer expires, and MME 108 increments the echo request timeout counter.

When MME 104 receives an initial attach message from an eNode B, MME 104 may select a signaling gateway using signaling gateway selection criteria, such as load balancing. MME 104 may exclude from the selection, any signaling gateways marked as risky. In this example, it is assumed that MME 104 selects signaling gateway 108. Accordingly, in line 2 of the call flow diagram, MME 104 sends a connection setup request to SGW 108. In line 3 of the call flow, MME 104 sends a create session request to SGW 108. The create session request message may be sent in response to an initial attach message received from an eNode B. When MME 104 sends the create session request message, MME 104 starts a timer for the create session request message. The time may be set to a longer value than the echo request timer, but the value may depend on whether the call has multiple legs. When MME 104 does not receive a response to the create session request within the timeout period for the request, MME 104 may increment a create session request counter. In the example illustrated in FIG. 3A, it is assumed that a create session request timeout occurs in line 5. When the create session request timeout counter expires, MME 104 increments the create session request timeout counter. Thus, after line 2 in the call flow in FIG. 3A, both the echo request timeout counter and the create session request timeout counter have a value of 1.

MME 104 may re-attempt transmission of the create session request a configurable number of times. Assuming that the configurable number of times has not been exceeded, in line 6 of the call flow diagram, MME 104 sends another create session request to SGW 108. In this example, the create session request message is a retransmission of the create session request message in line 4, which is for the same call. When the create session request timer expires for the create session request message in line 6, MME 104 increments the create session request timeout counter. Because the echo request timeout counter is at least 1 and the create session request timeout counter is at least 2, in line 7, MME 104 marks SGW 108 as risky. Thus, one scenario in which MME 104 may mark an SGW as risky is when an echo request timeout followed by two create session request timeouts occurs.

FIG. 3B illustrates another scenario in which MME 104 may mark an SGW as risky. In FIG. 3B, in line 1 of the call flow diagram, MME 104 sends a create session request message to SGW 108. The create session request may be in response to receiving a create session request from an eNode B. After sending the create session request message, SGW 108 starts the create session request timer. If a response is not received before the timer expires, a timeout occurs. Accordingly, in line 2, the create session timer expires, and MME 104 increments the create session request timeout counter.

In line 2 of the call flow diagram, MME 104 sends a second create session request message to SGW 108. The second create session request message may be for the same or for a different call than the create session request in line 1. When MME 104 transmits the create session request message in line 3, MME 104 starts the create session request timer. If a response is not received before the create session request timer expires, a timeout occurs. Accordingly, in line 4, a second create session request timeout occurs, and MME 104 increments the create session request timeout counter. Thus, after line 2, the create session request timeout counter has a value of 2.

In line 5 of the call flow diagram, rather than waiting for the next echo request retransmission period, the value of the create session request timeout counter reaching a value of two may trigger MME 104 to send an echo request message to SGW 108. Immediately sending the echo request message when the create session request timeout counter reaches a value of two can facilitate rapid detection of an SGW with risky status. When MME 104 transmits the echo request message, MME 104 starts the echo request timer. If a response is not received before the timer expires, a timeout occurs. In line 6, the echo request timer expires, and MME 104 increments the echo request timeout counter. After line 6, the echo request timeout counter has a value of one, and the connection setup request timeout counter has a value of two. Accordingly, in line 7, MME 104 marks SGW 108 as risky.

Figure 3C:
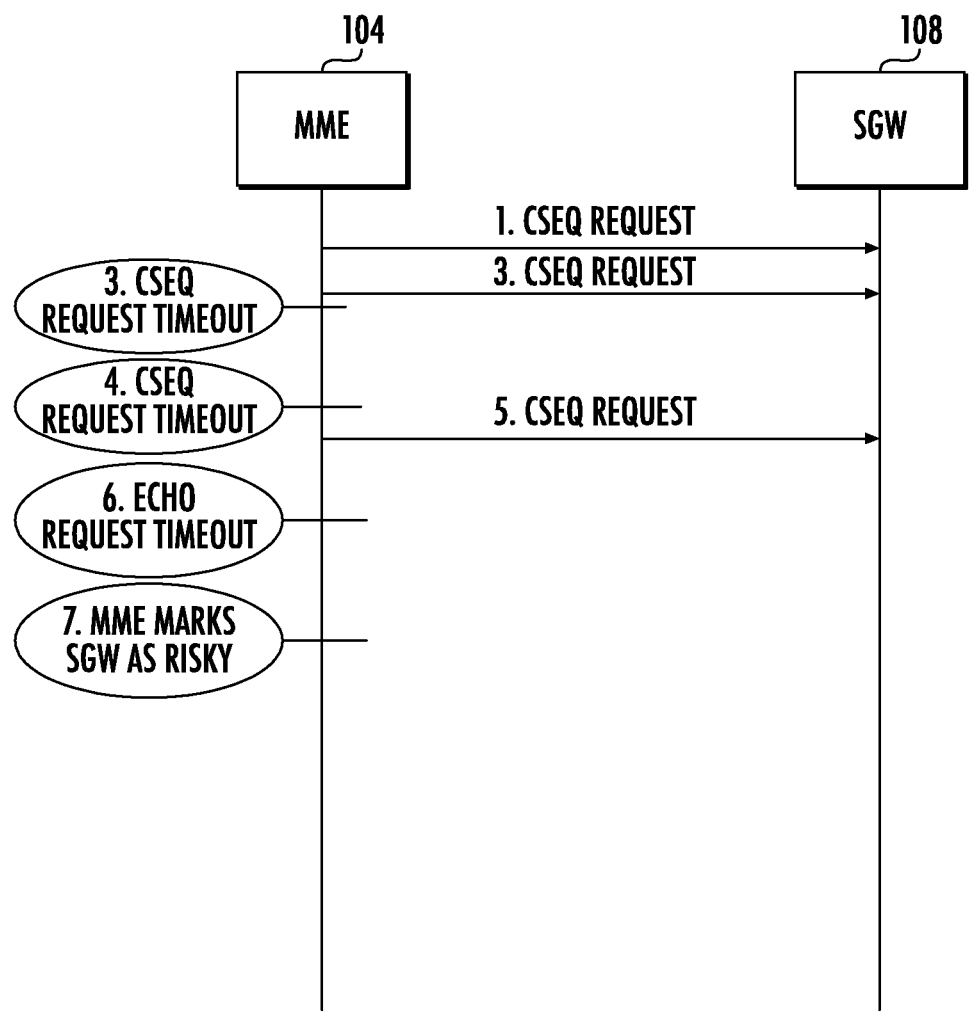
FIG. 3C is a call flow diagram illustrating yet another combination of messages and timings that will result in a signaling gateway being marked as risky.

It should be noted that the call setup request and echo request procedures operate independently from each other and thus the timeout period may be further shortened in the timeout period for the call setup requests and the echo requests run in parallel. This scenario is illustrated in FIG. 3C. In FIG. 3C, in line 1, MME 104 sends a create session request message to SGW 108. Before the create session request timeout occurs, MME 104 sends in line 2 an echo message to SGW 108. The sending of the echo request message in line 2 may be triggered by the time period between successive echo request messages elapsing. In line 3, the echo request timer expires because MME 104 does not receive a response to the echo request message, and MME 104 increments the echo request timeout counter. In line 4 of the call flow diagram, the create session request timer expires, an MME 104 increments the create session request timeout counter.

In line 5, MME 104 sends a second create session request message to SGW 108. In line 6, the create session request timer expires, and MME 104 increments the create session timeout counter. After line 6, the echo request timeout counter has a value of one and the create session request timeout counter has a value of two. Accordingly, in line 7, MME 104 marks SGW 108 as risky. Thus, FIG. 3C illustrates the case where timeout periods for create session and echo request messages run in parallel.

As indicated above, once an SGW is marked as risky, emergency calls should not be routed to the risky SGW. In one example, when enhanced SGW status detector and emergency call router 204 receives a create session request for a call marked as an emergency call, enhanced SGW status detector and emergency call router 204 may traverse the list of SGWs in SGW status database 206. If the status of a given SGW is marked as risky, it will be avoided for emergency call setup. If an SGW is not marked as risky or down, it may be selected for an emergency call, based on any other suitable criteria, including load balancing.

For an initial attachment for an emergency call, a UE identifies a call as an emergency call in the initial attach message. When such a message reaches MME 104, it is determined whether plural SGWs are available for the call. If plural SGWs are available and some of the SGWs are marked as risky, the risky SGWs may be omitted from the SGW selection process. Enhanced SGW status detector and emergency call router 204 may select from SGWs that are not marked as risky or down. Enhanced SGW status detector and emergency call router 204 then routes the create session message to the selected SGW.

Figure 4A:
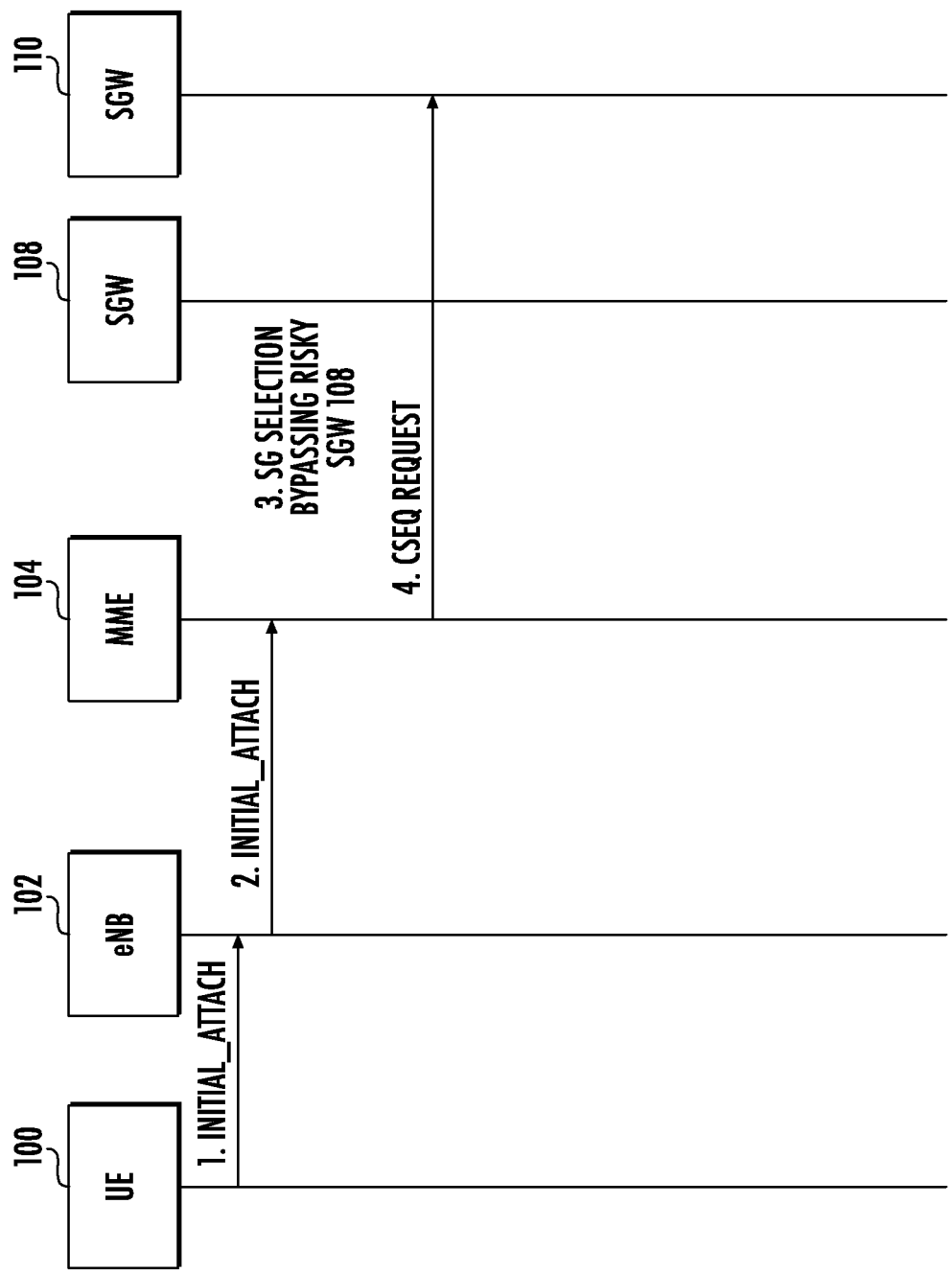
FIG. 4A is a call flow diagram illustrating signaling gateway selection for an initial call setup when a signaling gateway has been marked as risky.

FIG. 4A is a call flow diagram illustrating the bypassing of the risky signaling gateway for an initial attachment of an emergency call. Referring to FIG. 4A, in line 1 of the call flow diagram, UE 100 sends an initial attach message to eNode B 102 for an emergency call. In line 2, eNode B 102 sends the initial attach message to MME 104. In line 3, MME 104 performs signaling gateway selection by accessing database 206 and determining that SGW 108 is marked as risky. Accordingly, in line 4, MME 104 bypasses risky SGW 108 and sends a create session request message to SGW 110, which is not marked as risky.

Figure 4B:
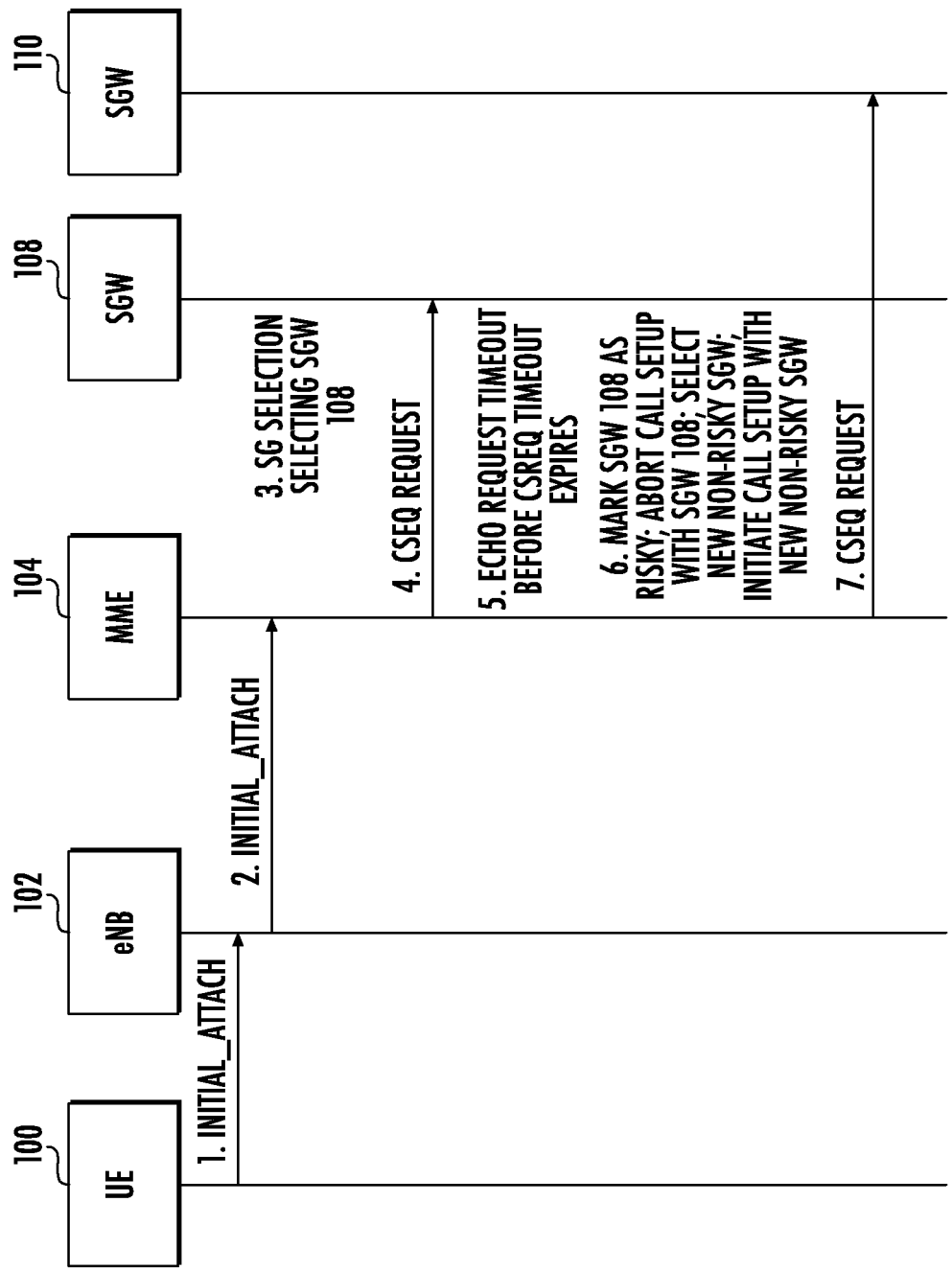
FIG. 4B is a call flow diagram illustrating signaling gateway selection for an aborted call setup when a signaling gateway is marked as risky during the call setup.

Another use case for the subject matter described herein occurs when an emergency call setup is in progress with an SGW and the SGW fails or is determined to be risky during the call setup. In this example, if an emergency call setup is in progress, enhanced SGW status detector and emergency call router 204 aborts call setup with the existing SGW, selects a new non-risky SGW, and initiates call setup with the newly selected SGW. FIG. 4B illustrates this case.

Referring to FIG. 4B, in line 1, UE 100 sends an initial attach message to eNode B 102 for an emergency call. In line 2, eNode B 102 sends the initial attach message to MME 104. In line 3, MME 104 performs signaling gateway selection by accessing database 206 and selecting SGW 108, which is not currently marked as risky. Accordingly, in line 4, MME 104 sends a create session request message to SGW 108.

In line 5, the echo request request timer expires, resulting in an echo request timeout. In this example it is assumed that two CSeq request timeouts have occurred when the echo request timeout occurs. As a result, in line 5, MME 104 marks SGW 108 being marked as risky. In line 6, rather than waiting for the CSeq request timer to expire, MME 104 aborts the call setup with risky SGW 108, selects a new non-risky SGW 110, and, in line 7, sends a new create session request message to non-risky SGW 110.

Yet another use case for the subject matter described herein is the routing of emergency calls when a default bearer exists. According to this procedure, when an emergency 911 call is made, and a default bearer already exists for the user with a signaling gateway SGW 1, and SGW 1 is marked as risky, the following steps describe the processing of a new request:

1. A new create session request arrives at the MME.
2. The MME determines that SGW 1 is marked as risky in database 206 and thus does not select the default bearer provided by SGW 1 for the new session.
3. The MME selects another SGW, SGW 2, for the call where SGW 2 is not marked as risky.
4. Context data blocks at the PGW with respect to SGW 1 are deleted once the new create session request reaches the PGW.
5. The context data block on SGW 1 would timeout.
6. With additional configuration, once the temporary emergency call is completed, the context data on SGW 2 may be cleared because the context data was obtained from SGW 1.
7. The MME may be updated to select SGW 2 for all future calls while the configuration to pick SGW 2 remains.

The call flow for the default bearer case may be the same as that illustrated in FIG. 4A or FIG. 4B, depending on whether call setup is in progress or not at the time the SGW is marked as risky.

Figure 5:
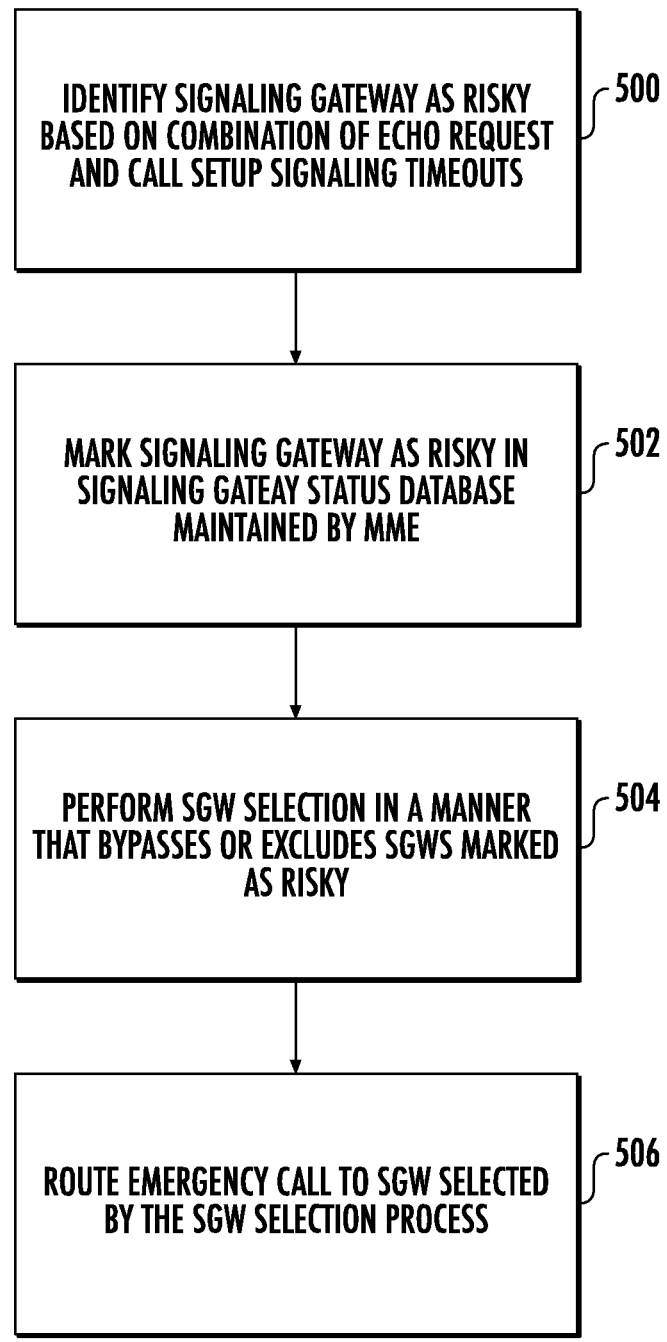
FIG. 5 is a flow chart illustrating an exemplary process for enhanced signaling gateway status detection and selection for emergency calls.

FIG. 5 is a flow chart illustrating an exemplary process for enhanced SGW failure detection and emergency call routing. Referring to FIG. 5, in step 500, an SGW is determined to be in a risky state based on a combination of echo request and call setup signaling timeouts. For example, enhanced signaling gateway status detector and emergency call router 204 may determine that an SGW is in a risky state if one echo request timeout and two call setup signaling message timeouts occur for a given SGW. In one example, as illustrated in FIG. 3A, enhanced signaling gateway status detector and emergency call router 204 may mark an SGW as risky in response to an echo request timeout followed by two create session setup request timeouts. In another example as illustrated in FIG. 3B, enhanced signaling gateway status detector and emergency call router 204 may mark an SGW as risky when there is at least some overlap between create session setup and echo request timeout periods. In yet another example as illustrated in FIG. 3C, enhanced signaling gateway status detector and emergency call router 204 may send an echo request message triggered by a second create session request timeout and may mark an SGW as risky in response to timeout of the echo request timeout.

In step 502, the SGW is marked as risky in an SGW status database maintained by the MME. For example, enhanced SGW status detector and emergency call router 204 may mark SGWs detected as being risky in database 206.

In step 504, signaling gateway selection is performed for the emergency call in a manner that bypasses signaling gateways marked as risky. For example, enhanced signaling gateway status detector and emergency call router 204 may select a non-risky signaling gateway for a call from among available non-risky signaling gateways in SGW status database 206. The selection may be an initial signaling gateway selection for an emergency call for which no previous SGW has been selected, as illustrated in FIG. 4A. In another example, the selection may be a selection of a new signaling gateway for a call setup in progress when the existing signaling gateway selected for the call is marked as risky during the call setup, as illustrated in FIG. 4B.

In step 506, the emergency call is routed to the SGW selected by the SGW selection process. Routing the call to the selected SGW may be effected by sending a create session setup request message to the selected SGW.

Exemplary advantages of the subject matter described herein include the following:
1. Because SGWs that are transitioning to a failure state can be detected early, a delay in establishment of emergency calls is reduced;
2. A network optimization can also be obtained as the number of calls routed to a failing SGW is reduced, which results in a reduced number of redirections and retry attempts.
3. The number of failure messages, network utilization, and time required for SGW transitions are reduced.

An advance or advantage relating to early detection of SGW failure during initial emergency call establishment over existing procedures is that under existing procedures, it takes three consecutive connection request timeouts to select another SGW. If the default value of the connection request timeouts is sixty seconds, it would take 180 seconds before blacklisting the SGW.

Similarly, if echo request is enabled, another echo request is sent after a default value of sixty seconds with a default value for a timeout of five seconds. Three failures would be required to mark the SGW as down. Thus, using existing echo request procedures, a minimum of 185 seconds would be required to detect the SGW failure.

With the enhanced SGW status detector and emergency call router 204, instead of depending on three consecutive connection request time\outs or three consecutive echo request timeouts, a combination of these messages can be used to reduce call setup time. For example, enhanced SGW status detector and emergency call router 204 checks for an echo request failure towards an SGW in question across the node instead of a call. A counter of failed echo requests is incremented in response to an echo request timeout. If two call setup request time outs occur, an echo request is transmitted immediately instead of waiting sixty seconds since the last echo request initialization. This could result in sixty seconds or more of decreased call setup time. If a failure on an echo request and two call setup requests occur from the MME to the SGW, the SGW is marked as risky for emergency calls.

If an echo request has already failed and two more call setup failures occur, the SGW is marked as risky. If the call setup response is received, the counters are cleared, and the SGW is not marked as risky. Thus, the combination of detection using both types of messages results in rapid establishment of emergency calls.

The early SGW status detection procedures described herein can also facilitate reestablishment when a bearer is already set up, but radio frequency (RF) side channels have been cleaned up due to idle timeout, and a reattach is needed.

If an initial emergency attach is received, instead of picking a preselected signaling gateway or a new signaling gateway which could be in a risky state, MME 104 picks an SGW that is not marked as risky.

If an emergency call setup is in progress, instead of waiting for a complete failure detection timeout due to non-receipt of call setup signaling messages, MME 104 detects risky SGWs early, aborts call setup with risky SGWs, and starts a session with a non-risky SGW.

The disclosure of each of the following references is hereby incorporated by reference herein in its entirety.

REFERENCES 1. 3GPP TS 29.060, V 15.4.0 (2019-03); 3rd Generation Partnership Project; Technical Specification Group Core Network and Terminals; General Packet Radio Service (GPRS); GPRS Tunneling Protocol (GTP) across the Gn and Gp Interface (Release 15)
2. 3GPP TS 29.274 V15.7.1 (2019-03); 3rd Generation Partnership Project; Technical Specification Group Core Network and Terminals; 3GPP Evolved Packet System (EPS); Evolved General Packet Radio Service (GPRS) Tunneling Protocol for Control plane (GTPv2-C); Stage 3 (Release 15)
3. 3GPP TS 23.401 V16.2.0 (2019-03); 3rd Generation Partnership Project; Technical Specification Group Services and System Aspects; General Packet Radio Service (GPRS) enhancements for Evolved Universal Terrestrial Radio Access Network (E-UTRAN) access (Release 16)
4. ETSI TS 29.160 V15.2.0 (2018-07) Digital cellular telecommunications system (Phase 2+) (GSM); Universal Mobile Telecommunications System (UMTS); General Packet Radio Service (GPRS); GPRS Tunneling Protocol (GTP) across the Gn and Gp interface (3GPP TS 29.060 version 15.2.0 Release 15)

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for enhanced signaling gateway status detection and selection for emergency calls, the method comprising:
in a mobility management entity (MME) including at least one processor:
detecting that a signaling gateway is in a risky state using a combination of echo request and call setup signaling timeouts, wherein detecting that the signaling gateway is in a risky state includes detecting that the signaling gateway is in a risky state in response to an echo request timeout from the MME to the signaling gateway and two create session request timeouts from the MME to the signaling gateway, wherein the two create session request timeouts are for the same call;
marking the signaling gateway as risky in a signaling gateway status database maintained by the MME;
performing signaling gateway selection for an emergency call in a manner that excludes signaling gateways marked as risky; and
routing the emergency call to a signaling gateway selected by the signaling gateway selection.

2. The method of claim 1 wherein the echo request timeout occurs prior to the create session request timeouts.

3. The method of claim 1 wherein the echo request timeout occurs after one of the create session request timeouts.

4. The method of claim 1 wherein transmission of an echo request message for which the echo request timeout occurs is triggered by detection of a second of the two create session request timeouts.

5. A method for enhanced signaling gateway status detection and selection for emergency calls, the method comprising:
in a mobility management entity (MME) including at least one processor:
detecting that a signaling gateway is in a risky state using a combination of echo request and call setup signaling timeouts, wherein detecting that the signaling gateway is in a risky state includes detecting that the signaling gateway is in a risky state in response to an echo request timeout from the MME to the signaling gateway and two create session request timeouts from the MME to the signaling gateway, wherein the two create session request timeouts are for different calls;
marking the signaling gateway as risky in a signaling gateway status database maintained by the MME;
performing signaling gateway selection for an emergency call in a manner that excludes signaling gateways marked as risky; and
routing the emergency call to a signaling gateway selected by the signaling gateway selection.

6. The method of claim 1 performing the signaling gateway selection includes performing the signaling gateway selection in response to an initial attach message from an evolved Node B (eNode B).

7. The method of claim 1 wherein performing the signaling gateway selection includes selecting a new signaling gateway for a call for which a signaling gateway assigned to the call is determined to be risky during setup of the call.

8. The method of claim 1 wherein performing the signaling gateway selection includes selecting a new signaling gateway for a call for which a default bearer exists on an signaling gateway currently assigned to the call and that has been marked as risky.

9. A system for enhanced signaling gateway status detection and selection for emergency calls, the system comprising:
a mobility management entity (MME) including at least one processor;
a signaling gateway status database located in the MME and containing status information for signaling gateways accessible by the MME; and
a signaling gateway status detector and emergency call router for detecting that signaling a gateway is in a risky state using a combination of echo request and call setup signaling timeouts, marking the signaling gateway as risky in a signaling gateway status database maintained by the MME, performing signaling gateway selection for an emergency call in a manner that excludes signaling gateways marked as risky, and routing the emergency call to a signaling gateway selected by the signaling gateway selection, wherein detecting that the signaling gateway is in a risky state includes detecting that the signaling gateway is in a risky state in response to an echo request timeout from the MME to the signaling gateway and two create session request timeouts from the MME to the signaling gateway, wherein the two create session request timeouts are for the same call.

10. The system of claim 9 wherein the echo request timeout occurs prior to the create session request timeouts.

11. The system of claim 9 wherein the echo request timeout occurs after one of the create session request timeouts.

12. The system of claim 9 wherein transmission of an echo request message for which the echo request timeout occurs is triggered by detection of a second of the two create session request timeouts.

13. A system for enhanced signaling gateway status detection and selection for emergency calls, the system comprising:
a mobility management entity (MME) including at least one processor;
a signaling gateway status database located in the MME and containing status information for signaling gateways accessible by the MME; and
a signaling gateway status detector and emergency call router for detecting that signaling a gateway is in a risky state using a combination of echo request and call setup signaling timeouts, marking the signaling gateway as risky in a signaling gateway status database maintained by the MME, performing signaling gateway selection for an emergency call in a manner that excludes signaling gateways marked as risky, and routing the emergency call to a signaling gateway selected by the signaling gateway selection, wherein detecting that the signaling gateway is in a risky state includes detecting that the signaling gateway is in a risky state in response to an echo request timeout from the MME to the signaling gateway and two create session request timeouts from the MME to the signaling gateway, wherein the two create session request timeouts are for different calls.

14. The system of claim 9 performing the signaling gateway selection includes performing the signaling gateway selection in response to an initial attach message from an evolved Node B (eNode B).

15. The system of claim 9 wherein performing the signaling gateway selection includes selecting a new signaling gateway for a call for which a signaling gateway assigned to the call is determined to be risky during setup of the call.

16. A non-transitory computer readable medium having stored thereon executable instructions that when executed by the processor of a computer controls the computer to perform steps comprising:

in a mobility management entity (MME) including at least one processor:

detecting that a signaling gateway is in a risky state using a combination of echo request and call setup signaling timeouts, wherein detecting that the signaling gateway is in a risky state includes detecting that the signaling gateway is in a risky state in response to an echo request timeout from the MME to the signaling gateway and two create session request timeouts from the MME to the signaling gateway, wherein the two create session request timeouts are for the same call;

marking the signaling gateway as risky in a signaling gateway status database maintained by the MME;

performing signaling gateway selection for an emergency call in a manner that excludes signaling gateways marked as risky; and routing the emergency call to a signaling gateway selected by the signaling gateway selection.

\* \* \* \* \*

UNITED STATES PATENT AND TRADEMARK OFFICE
CERTIFICATE OF CORRECTION

PATENT NO.           : 11,012,931 B2                                              Page 1 of 1
APPLICATION NO.      : 16/422908
DATED                : May 18, 2021
INVENTOR(S)          : Rohit Juneja It is certified that error appears in the above-identified patent and that said Letters Patent is hereby corrected as shown below:

In the Claims

Column 13, Line 55 replace "performing" with --wherein performing--

Column 14, Line 60 replace "performing" with --wherein performing--

Signed and Sealed this
Twenty-fourth Day of August, 2021

Drew Hirshfeld
*Performing the Functions and Duties of the*
*Under Secretary of Commerce for Intellectual Property and*
*Director of the United States Patent and Trademark Office*